INVENTOR.
Leonard R. Kahn
BY
John O. Graybeal
ATTORNEY.

March 21, 1961 L. R. KAHN 2,976,411

AUTOMATIC FREQUENCY CONTROL SYSTEM SUITABLE FOR SINGLE-SIDEBAND RECEIVERS, FREQUENCY MODULATION TRANSMITTERS AND THE LIKE

Filed June 16, 1958 4 Sheets-Sheet 2

INVENTOR.
Leonard R. Kahn
BY John O. Graybeal
ATTORNEY.

AUTOMATIC FREQUENCY CONTROL SYSTEM SUITABLE FOR SINGLE-SIDEBAND RECEIVERS, FREQUENCY MODULATION TRANSMITTERS AND THE LIKE

Filed June 16, 1958

INVENTOR.
Leonard R. Kahn
BY
John O. Graybeal
ATTORNEY.

March 21, 1961 L. R. KAHN 2,976,411

AUTOMATIC FREQUENCY CONTROL SYSTEM SUITABLE FOR SINGLE-SIDEBAND RECEIVERS, FREQUENCY MODULATION TRANSMITTERS AND THE LIKE

Filed June 16, 1958 4 Sheets-Sheet 4

INVENTOR.
Leonard R. Kahn
BY John O. Graybeal
ATTORNEY.

United States Patent Office 2,976,411
Patented Mar. 21, 1961

2,976,411

AUTOMATIC FREQUENCY CONTROL SYSTEM SUITABLE FOR SINGLE-SIDEBAND RECEIVERS, FREQUENCY MODULATION TRANSMITTERS AND THE LIKE

Leonard R. Kahn, 81 S. Bergen Place, Freeport, N.Y.

Filed June 16, 1958, Ser. No. 742,221
13 Claims. (Cl. 250—20)

The present invention relates to automatic frequency control systems and more particularly to an improved automatic frequency control system for accurately maintaining precise frequency stability in single-sideband receivers, frequency modulating transmitters, exalted carrier receivers, frequency modulation monitors, deviation indicators, and the like. The frequency control system of the present invention finds especial application in FM multiplex systems because it offers a means for producing low distortion, high stability signals.

One of the main problems found in conventional automatic frequency control systems is frequency stabilization. That is, in all so-called automatic frequency control (AFC) or frequency correction systems there must be a basic or reference frequency which is assumed to be correct. If this reference frequency is not correct, the system will have an ambient error and will not properly perform.

In conventional automatic frequency control systems this reference frequency has been the tuned frequency of a discriminator. When the corrected frequency produces zero output voltage from the discriminator it is assumed that the frequency is correct. However, the tuned frequency of the discriminator is itself subject to error and drift. This problem has heretofore necessitated extraordinary stabilization measures for control, such as temperature controlled ovens and very special mechanical design. Also, there has been some use made of crystal type discriminators. These measures improve the overall performance but are quite expensive and in the case of the crystal discriminator very difficult to adjust.

Basically, the present invention makes use of a crystal oscillator as its reference and generates large pulses of frequency modulation to effect stabilization control of the reconditioned carrier frequency. Since the art of producing highly stable frequencies is well known and remarkable accuracies have been obtained, reliance upon the stability of an oscillator makes for a stable system, and use of frequency modulation pulse comparison of the reference frequency and the frequency to be corrected gives sensitive corrective control.

Use of automatic frequency control in single-sideband receivers makes it possible to employ oscillators both in the transmitter and receiver having only moderate stability. The carrier, once it is processed for AFC purposes, can be used for AVC and special coding operations. Special carrier coding systems have been developed that may be utilized for automatically controlling equipment at receiving points and also for use as an additional Teletype circuit.

In the case of FM transmitters, one of the simplest techniques of frequency modulation generation is the reactance tube system. This system offers means for generating wideband FM waves not requiring extensive use of frequency multipliers which are relatively expensive and somewhat difficult to adjust. Also, the transmission of an FM wave through a large number of tuned circuits increases the possibility of introducing distortion. Thus, the reactance tube system not only appears to be an inexpensive means for generating FM waves but also provides a simple means for obtaining relatively distortion-free signals.

The AFC system of the present invention takes advantage of the fact that the vector resultant of two almost equal sine waves produces large pulses of frequency modulation. These pips are negative (that is the resultant frequency swings below the average frequencies) when the weaker sine wave is higher in frequency than the stronger one. When the weaker one is lower in frequency, the pips are positive (higher frequency pips than the average frequency). If a reference frequency is produced which has an amplitude slightly greater than that of the signal to be corrected, then we find that the polarity of the frequency modulation pulses will reverse whenever the frequency to be corrected passes through the reference frequency.

The rate of occurrence of such frequency modulated pulses is equal to the difference between the reference frequency and the frequency to be corrected. Thus, if these frequencies are separated by 10 cycles, there are 10 pulses per second produced. Since the number of pulses per second is a linear function of the difference frequency, a linear discriminator action is achieved. In order to obtain this linearity it is necessary to make certain that the width and amplitude of the FM pulses is independent of the frequency difference between the reference frequency and the frequency to be corrected. This linearity is of great importance when correcting frequency modulation transmitters so as to allow an averaging out of the desired frequency modulation excursions. Thus, when the signal is modulated by a wave that does not have a D.C. component, the average frequency remains constant. If this FM wave is fed to a discriminator which is linear, the D.C. output of the discriminator is constant and is not a function of modulation. However, any distortion in the discriminator produces a shifting of the D.C. from the discriminator producing a false correcting voltage. Therefore, it is exceedingly important that a linear discriminator be used in automatic frequency control systems for FM transmitters or receivers.

However, linearity is not a requirement in unmodulated correction circuits such as used in a single-sideband receiver because no averaging of frequency is required as there is no desired modulation of the frequency. Two versions of the automatic frequency control circuit for single-sideband system use will be shown. One produces a linear discriminator effect and the other can be nonlinear. The linear discriminator involves accurate control of the pulse width and pulse amplitude and would merely count the number of pulses and produce a voltage which was a linear function of the number of pulses per second.

In order to illustrate the basic technique and certain typical applications of the present invention, reference will be made to the following description and the accompanying drawings, wherein like numerals refer to like parts and wherein.

Figure 8:
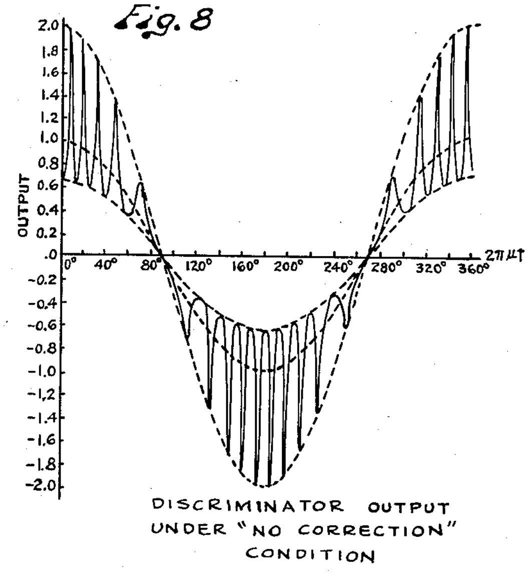
Fig. 8 is a waveform showing the pulse output from the discriminator superimposed on an audio modulation signal, with the number of positive pulses equalling the number of negative pulses, indicating the carrier and interfering signal to have identical frequencies.
Figure 9:
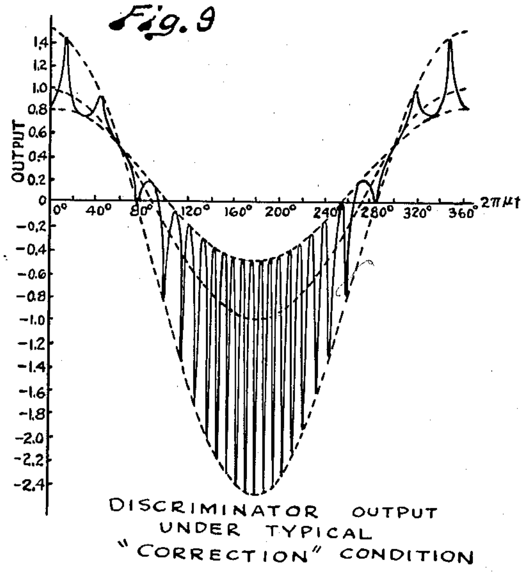
Figure 10A:
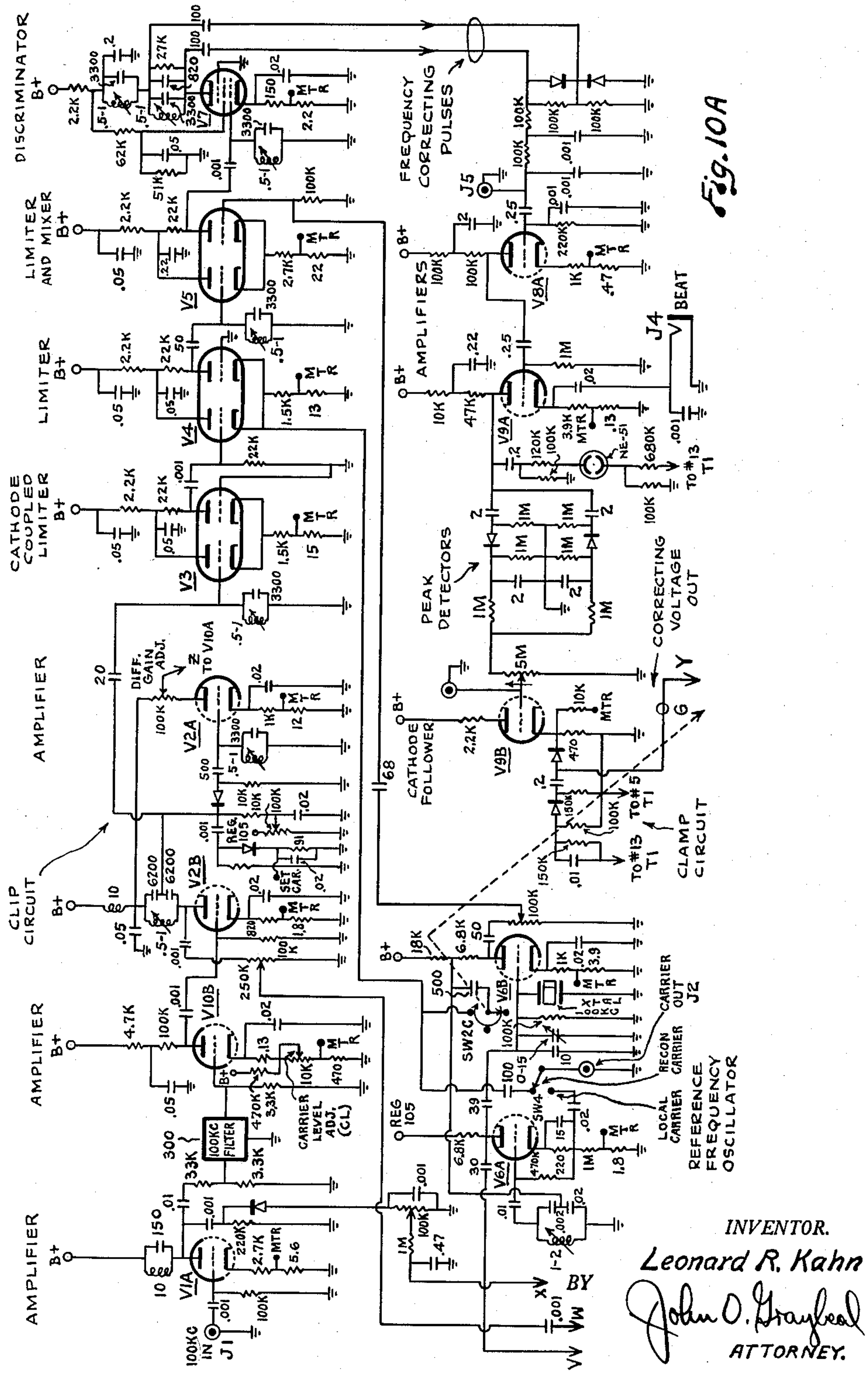
Figure 10B:
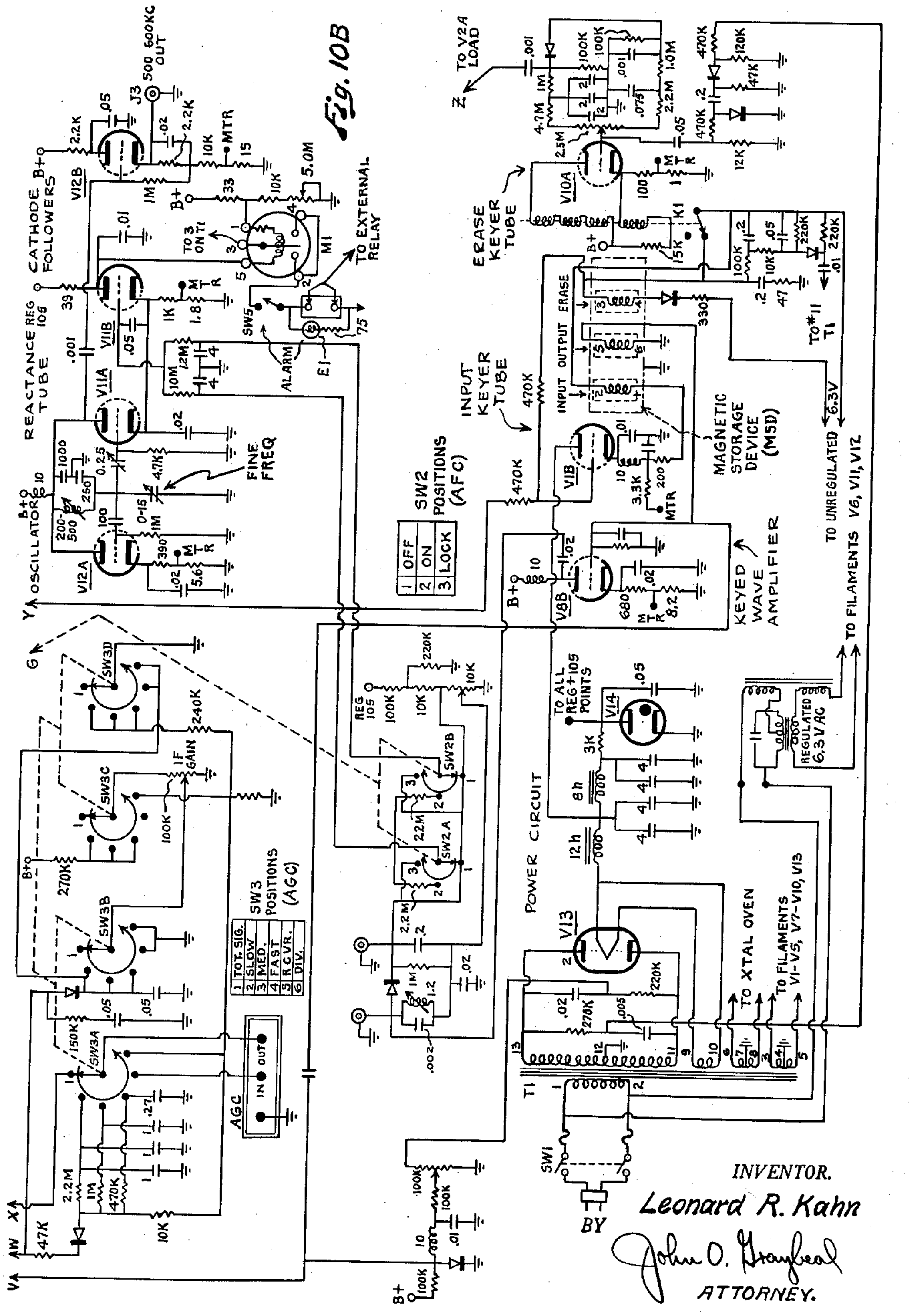

Fig. 9 is a waveform similar to that shown in Fig. 8, but with a greater number of negative pulses superimposed upon the audio wave, as a result of the reference signal being displaced in frequency from the desired carrier frequencies; and Figs. 10A and 10B in composite present a schematic of a carrier chain unit embodying the automatic frequency control system of the present invention, and including memory circuitry, suitable for incorporation with and stabilization of a single-sideband receiver, the carrier chain unit presented by Figs. 10A and 10B incorporating a complete carrier channel, including a narrow band carrier filter, the new type automatic frequency control system of the present invention, and utilizing therewith a magnetic storage device maintaining carrier stability during periods of carrier fading.

In general, and with reference to the carrier chain unit typifying the present invention, as presented in Figs. 10A and 10B, it will be evident that such is also usable as a separate item of commerce having utility in modernizing and improving conventional single-sideband receiver adapters, and achieving extremely accurate automatic frequency control, allowing use of local carrier operation for voice signals easily within tolerable power and fidelity standards.

Figure 1:
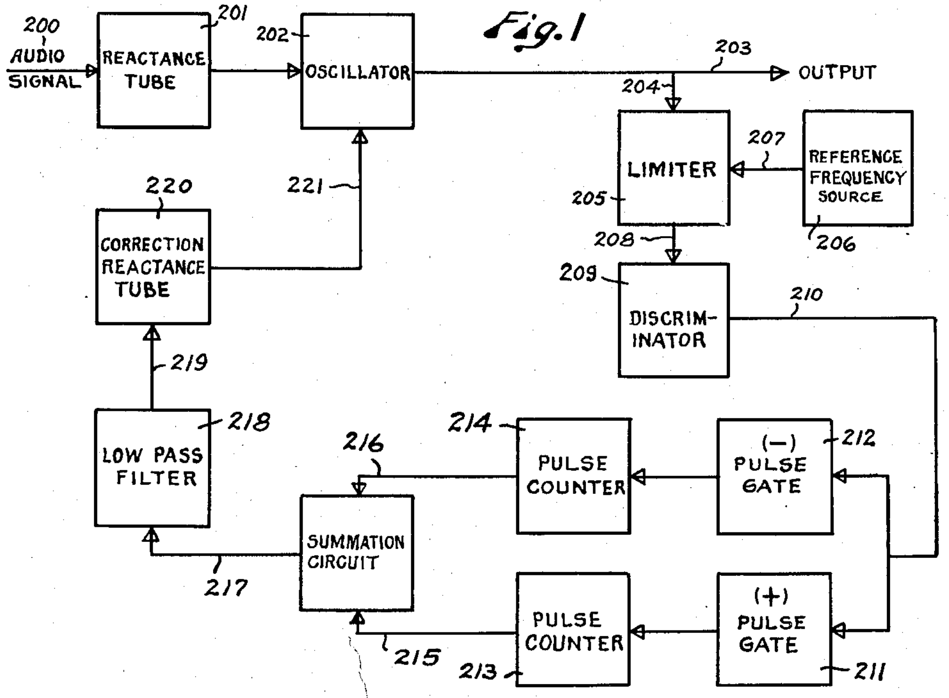
Fig. 1 is a block diagram of a frequency modulation exciter utilizing an automatic frequency control system according to the present invention.

Turning to a more detailed consideration of a typical circuit incorporating an automatic frequency control system according to the present invention, Fig. 1 presents a block diagram of frequency modulation exciter.

In Fig. 1, audio signal 200 is fed to a reactance tube modulator 201 which varies the frequency of oscillator 202 to which it is coupled. It will be understood that oscillator 202 generates the desired carrier frequency or multiple or submultiple thereof and that the output of oscillator 202 is fed to an output circuit which in turn feeds power amplifiers and frequency multipliers or frequency converters in a manner conventional per se so as to obtain a proper frequency and power in output 203. As used herein, the term carrier component frequency is used to denote such carrier frequency, or multiple, or submultiple thereof.

A sample, diagrammatically indicated at 204, of the output 203 of oscillator 202 is also fed to a limiter 205 wherein a reference frequency from reference frequency source 206 is added and the summation output is amplitude limited in said limiter 205. Reference frequency source 206 can be a crystal controlled oscillator circuit, or can be a second frequency modulated signal, such as available in a multiplexing arrangement. Considering the simplified version wherein the reference frequency is a steady unmodulated frequency, such as available from a crystal oscillator, the frequency modulated signal 204 and the reference frequency 207, when mixed and amplitude limited in limiter 205, produce positive and negative excursions of frequency modulation, the particular relationship and number of positive and negative excursions depending upon the correlation between the center frequency of signal 204 and the reference frequency of signal 207.

The phenomenon of frequency modulation excursions resulting from mixing a frequency modulated signal with another signal of closely similar frequency, such as occurs in limiter 205, is broadly known per se, as evidenced by an article by M. S. Corrington in the December 1946 issue of RCA Review.

According to the present invention, such frequency modulation excursions are converted to positive and negative pulses by discrimination and are then utilized, by simple pulse comparison techniques, to effect sensitive automatic frequency control.

Output 208 from limiter 205 is fed to discriminator 209, the output 210 of which may include an audio wave (representing the audio signal 200) plus superimposed pulses (again see Figs. 8 and 9).

Output 210 from discriminator 209 is fed to positive pulse gate 211 and negative pulse gate 212, each respectively feeding pulse counters 213 and 214, the respective outputs 215 and 216 from which are proportional to the number of positive and negative pulses counted in said pulse counters 213 and 214. For example, should the output of positive pulse counter 214 be positive and the output of the negative pulse counter 213 be negative, the summation output 217 of the two when integrated in lowpass filter 218 provides a correcting voltage output 219 for correction reactance tube 220, which in turn corrects the center frequency of oscillator 202 by correction voltage 221. Excellent frequency stability has been obtained from the circuit diagrammatically presented in Fig. 1 and correction maintained within a few cycles of the reference frequency 206, with and without modulation, has been achieved.

During recent years, many FM radio stations have initiated multiplex broadcasting. Multiplex operation accentuates the requirement for linearity in the frequency modulation transmitter, because intermodulation distortion often causes cross-talk between two channels. Cross-talk is especially noticeable in a multiplexed channel because it normally is modulated to a very much lesser extent than the main channel. Since the above described frequency control system allows the use of wideband, low distortion reactance tubes, it is especially suitable for multiplex systems.

Consideration is next given to use of the basic automatic frequency control circuit of the present invention, as employed to automatically control the frequency of single-sideband and exalted-carrier type receivers. In such an application, a typical arrangement of which is presented diagrammatically in Fig. 2, it is necessary to correct the incoming carrier frequency in order to closely approximate the local carrier frequency and for this purpose a small amount of carrier is usually transmitted.

The incoming single-sideband wave and carrier are first amplified in RF amplifier 230, then heterodyned with the output of a first local oscillator 231 to obtain the desired IF frequency (500 kc. being selected by way of example) in a first mixer stage 232. It will be understood that in this type of equipment the output from first mixer stage 232 is normally fed to an intermediate frequency amplifier 233 and, in the circuit presented, the output of this intermediate frequency amplifier 233 is fed to a second mixer stage 234. The output of said second mixer stage 234 is, in a typical case, 100 kc. plus or minus the sideband frequencies, which output is passed to conventional sideband filters and detectors, as indicated at 235. A portion of the carrier wave, which carrier is to be corrected in order to produce an exactly 100 kc. signal, is fed to carrier pass filter 236, a portion of the isolated carrier being passed to detectors in a manner also conventional per se, as indicated at 237, and a further portion or sample of the isolated carrier is fed to a limiter 238, establishing same at a constant amplitude. Carrier pass filter 236 is extremely narrow and in a typical design is 50 cycles wide and has very great attenuation at the 100 cycle bandwidth points (on the order of −60 db).

The output 239 from limiter 238 is fed to a second limiter 240 wherein a reference frequency output 241 from reference frequency oscillator 242 (again selected at 100 kc. by way of example) is mixed with amplitude limited carrier 239 and limited to constant amplitude in output 243. Said output 243 from limiter 240 is in turn fed to a discriminator 244, tuned to a 100 kc., but such tuning is not critical. Output 245 from discriminator 244 is a series of positive and negative pulses or pips (again note Figs. 8 and 9), the predominant polarity of the pulses or pips depending upon whether the carrier frequency is above or below the reference frequency 241.

Said output 245 from discriminator 244 is, in turn, fed to an A.C. pulse amplifier 246 which in turn feeds positive and negative pulse gates 247 and 248. The respective outputs 249 and 250 from pulse gates 247 and 248 feed a common summation circuit 251 and the output of summation circuit 251 is fed to low pass filter 252. The positive and negative pulses are thus averaged and the resulting correction signal is used to correct for frequency drift by using the D.C. voltage output 253 from low pass filter 252 to regulate reactance tube 254, which in turn controls the frequency of a second local oscillator 255, operating at 600 kc., again by way of example, and providing the second input to second mixer stage 234, accomplishing the frequency correction desired.

It is to be noted that the single-sideband receiver version of the automatic frequency control system of the present invention does not require use of pulse counting circuitry because there is no need for discriminator linearity. It is further to be observed as an important advantage and feature of the present invention that, although discriminator linearity is not required in a single-sideband receiver application of the automatic frequency control circuit, the sensitivity of the automatic frequency control is a first order function of the frequency difference between the reference frequency and the carrier frequency. Further, it is a very important feature and comparative simplification of previous techniques in the art that an automatic frequency control circuitry does not involve or require 90° phase shift networks and does not employ amplitude modulation detection for error sensing. This latter point is a very important consideration in the light of the "fade" tendency often encountered. In other words, susceptibility of the present automatic frequency control circuit to errors arising from "fading" of the received signal is less than prior circuits generating a control or correcting voltage by amplitude modulation and/or phase comparison and detection. In short, the automatic frequency control circuit of the present invention senses frequency error by frequency excursion comparison, not amplitude modulation excursions, and is therefore more stable throughout a wider range of carrier level variations.

Figure 3:
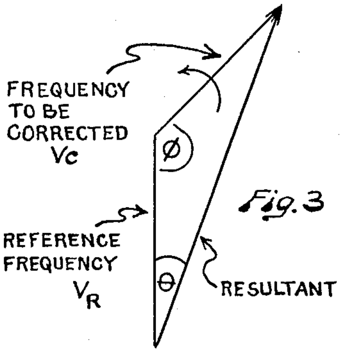
Fig. 3 is a frozen phasor diagram representing the vectoral addition of two sine waves, with the reference wave frozen, presented to indicate certain of the basic theory involved in the automatic frequency control system of the present invention.

Having now considered the diagrammatic layout of two versions of circuits incorporating the automatic frequency control system of the present invention, further consideration will now be given to some of the basic theory involved in this unique form of frequency control. Fig. 3 is a frozen phasor diagram representing the addition of two sine waves of approximately equal amplitude and frequency. Reference wave, vector $V_R$, is assumed to be the stronger of the two waves, for purposes of illustration and in the diagram of Fig. 3 said reference wave $V_R$ is frozen. The frequency to be corrected, vector $V_C$, has been assumed in said Fig. 3 to be at a somewhat higher frequency than reference wave $V_R$, and therefore is shown as revolving in a counter-clockwise direction with respect to the reference wave $V_R$.

Figure 4:
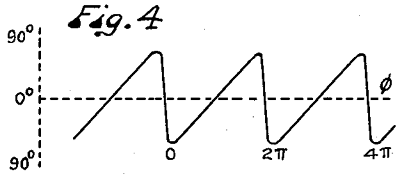
Fig. 4 shows the phase modulation component of the wave relationship presented in Fig. 3.

Fig. 4 shows the phase modulation relationship of the waves in Fig. 3. If the two waves were exactly equal in amplitude (vectors $V_R$ and $C_C$ exactly equal in length), the phase modulation wave presented in Fig. 4 would have a discontinuity at all integral multiples of 2 pi radians for $\phi$ (the angle between the two waves). As indicated, the phase modulation component wave shown in Fig. 4 is for the condition when the reference wave $V_R$ is slightly greater in amplitude than the frequency corrected BC and is slightly lower in frequency.

Figure 5:
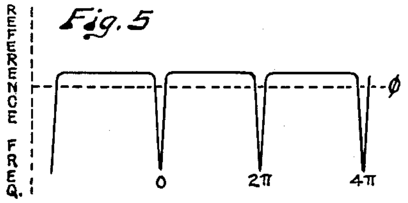
Fig. 5 is the frequency modulation equivalent of the wave shown in Fig. 4.

Since the frequency modulation equivalent of a phase modulation wave is equal to the first derivative of that phase modulated wave, the plot of Fig. 5 will be seen to be the FM equivalent of Fig. 4.

Figure 6:
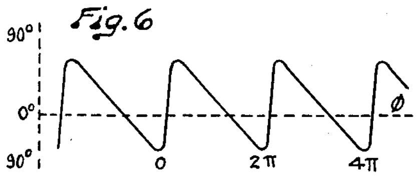
Fig. 6 is the phase modulation component for the case where the frequency controlled wave is lower in frequency than the reference wave.
Figure 7:
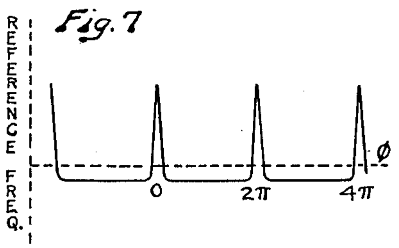
Fig. 7 is the frequency modulation equivalent of the waveform shown in Fig. 6.

Fig. 6 shows the phase modulation component for the case where the frequency controlled wave $V_C$ is lower in frequency than the reference wave $V_R$, and Fig. 7 is the corresponding FM equivalent.

It is to be noted that the resulting frequency modulation pulses switch polarity whenever the wave to be corrected shifts from a frequency higher to a frequency relatively lower than the reference wave. Thus, the reference frequency serves as an accurate cross-over point and maintains a high degree of accuracy in an automatic frequency control system utilizing this relationship. The rate of occurrence of the FM pulses is equal to the difference between the reference frequency and the frequency to be corrected. Thus, if these frequencies are separated by 10 cycles, there are ten pulses per second produced. Since the number of pulses per second is directly proportional to the difference in frequency, a linear discriminator characteristic can be easily achieved where necessary. In order to obtain this linearity, it is necessary to make certain that the width and amplitude of the FM pulses is independent of the frequency difference between the reference and the frequency to be corrected. The discriminator linearity characteristic is of importance when correcting frequency modulation transmitters, for example, because it is necessary to average out the desired frequency modulation excursion. In this regard, odd harmonic distortion, as well as even harmonic distortion, causes D.C. shift because common modulating waveshapes are not symmetrical.

Thus, in an FM transmitter exciter application, as presented in Fig. 1, pulse counters are utilized in conjunction with the pulse gates to provide the requisite linearity.

Figure 2:
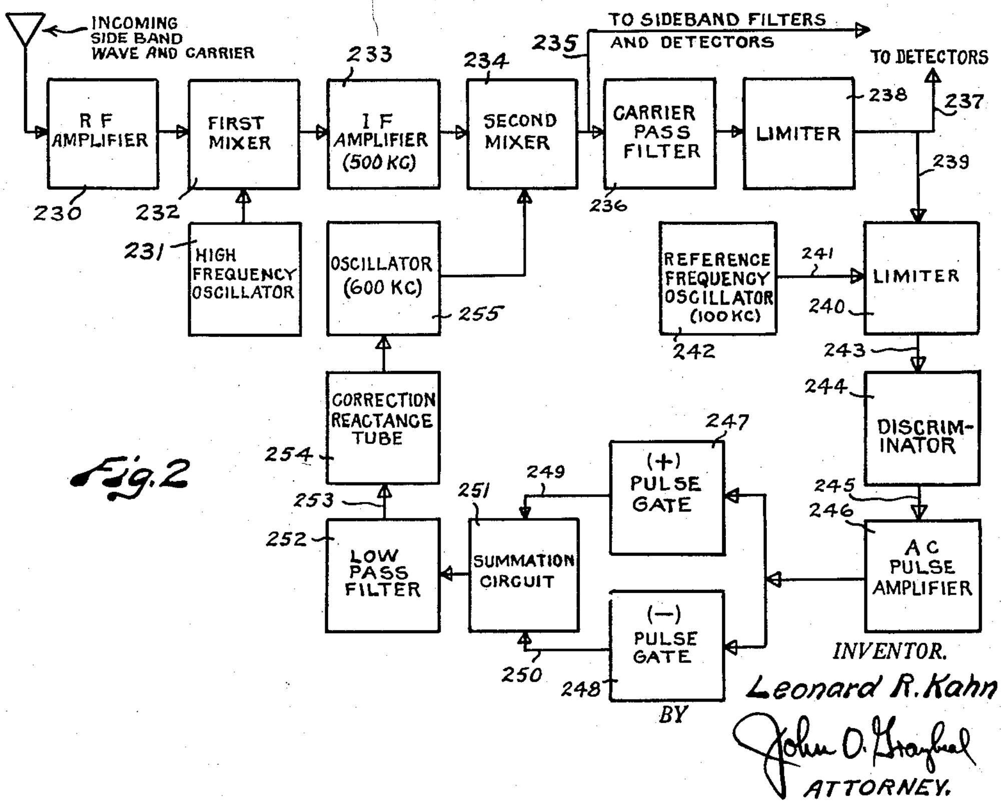
Fig. 2 is a block diagram of a single-sideband receiver utilizing the automatic frequency control system of the present invention.

Correspondingly, in a single-sideband receiver application, such as presented in Fig. 2, the carrier is isolated and stripped of all modulation so that there is no requirement for discriminator linearity, and it is not necessary to employ pulse counting circuits or to critically tune the discriminator (see 244).

Figs. 8 and 9 show typical pulse output waveforms occurring at the output of the discriminator (cf. discriminator 209 of Fig. 1 and discriminator 244 in Fig. 2), superimposed on a typical audio modulation signal. Fig. 8 shows the "balanced" condition where the number of positive pulses equals the number of negative pulses, the output from the summation circuit in such instance being zero, i.e. causes no correction of the reactance tube output to the local oscillator. Fig. 9 shows a waveform similar to Fig. 8, but with a greater number of negative pulses than positive pulses, again superimposed upon an audio wave, resulting in a corrective signal being generated in the summation circuit and low pass filter, with corresponding correction of the reactance tube output and change of the local oscillator frequency to correct the value of the carrier frequency.

Figs. 10A and 10B in composite present a schematic of a carrier chain unit typically embodying an automatic frequency control system according to the present invention and further including correction storage or memory circuitry to maintain tuning during periods of carrier fading. This type of chain unit, used in connection with a single-sideband receiver or the like, incorporates a complete carrier channel.

In Figs. 10A and 10B it will be understood that lines V, W, X, Y and Z are interconnected, and a mechanical ganging interconnection is shown at G.

In the schematic presentation of a specific circuit, as presented in Figs. 10A and 10B, standard symbols and value terminology have been employed, and reference should be made to this schematic for specific typical component values. Tube types employed in this circuit are as follows: V1, V2, V6, V9, V11 and V12 are 6SN7GTB's; V3, V4, V5, V8, and V10 are 6SL7GT's; V7 is a 6AC7; V13 is a 6627; and V14 is a 5U4GB.

In Figs. 10A and 10B, a 100 kc. single-sideband input wave is applied to input jack J1, serving as the input to amplifier V1A, the output of which feeds an extremely sharp 100 kc. crystal filter 300. Filter 300 isolates the carrier wave which is in turn amplified in amplifier V10B. Carrier level control adjustment CL is inserted in the cathode return of V10B. The output of amplifier V10B is fed to V2B, which in turn feeds cathode coupled limiter V3. The output of limiter V3 is fed to limiter V4. It is to be noted that the cathode of limiter V4 feeds the local or reconditioned carrier switch SW4, which in turn feeds the 100 kc. carrier output jack J2.

The carrier output from output jack J2 can be connected to a conventional single-sideband receiver adapter and used to feed the product detectors incorporated in the latter. Limiter V4 also feeds limiter V5. Limiter V5, in addition to being fed the isolated carrier output of limiter stage V4, is fed the output of the 100 kc. crystal oscillator V6, constituting the reference frequency source. These two signals then combine to produce a phase and amplitude modulated wave and the amplitude modulation is removed by action of limiter V5. The output of limiter V5 feeds discriminator V7 wherein frequency correcting pulses are produced. The predominant polarity of the pulses is solely dependent upon the frequency relationship between the carrier and the reference frequency generated in crystal oscillator V6.

Said frequency correcting pulses are fed to amplifier V8A which in turn feeds amplifier V9A. The cathode of V9A is fed to a headphone jack J4 which can be used to audibly monitor the rate of occurrence of the pulses. Since the pulse rate is equal to the automatic frequency control error, the lower the pulse rate the more accurate the frequency control. Amplifier V9A also feeds positive and negative peak diode detectors whose outputs are summated and fed to cathode follower V9B. The voltage at this point is the desired correcting voltage whose amplitude and polarity depend solely upon the frequency relationship between the incoming carrier and reference frequency signals.

The cathode follower V9B feeds a diode circuit wherein a 50–60 cycle line frequency wave is clamped by the D.C. output voltage from cathode follower V9B. This line frequency clamped wave is then fed to V1B wherein it keys on and controls the amount of current flowing through the input coil of the magnetic storage device MSD, a commercially available item. Magnetic storage device MSD is then periodically conditioned by the 50–60 cycle pulse fed to it by V1B. Also, at a line frequency rate, the magnetic storage device MSD is erased of its magnetic set by passing current through its erase coil from the 6.3 volt supply.

The input and erase coils of magnetic storage device MSD are disabled by relay K1 in a plate circuit of V10A, which is energized when the carrier power fades below a certain predetermined level. This circuit then operates so as to maintain the last set condition of the magnetic storage device MSD and keep the automatic frequency control circuit correctly tuned during the fade period. V10A is controlled by a circuit establishing a rectified voltage on the grid thereof, which input circuit is in turn fed from the plate circuit of amplifier V2A. A special clipping type diode circuit is used in the input to stage V10A in order to obtain a large amount of amplification without overloading the amplifier V2A. This diode circuit, shown on the schematic between stages V2A and V2B, clips the top of the 100 kc. wave so that only the variable portion thereof is amplified in V2A.

The output coil of the magnetic storage device MSD is used as part of a tuned circuit, tuned approximately to 100 kc., and is fed a keyed 100 kc. wave. The rate of keying is equal to the line frequency and this keyed 100 kc. wave is fed to tube V8A. The amplitude of the keyed 100 kc. wave is determined by the amount of current passed through the input coil of the magnetic storage device MSD, which amount of current is in turn determined by the error automatic frequency control voltage produced at the input to V9B. This keyed 100 kc. wave, after amplification in V8B, is rectified and fed through the automatic frequency control "on-off-lock" switch SW2 to cathode follower V11B through a low pass filter which is in turn cathode coupled to reactance tube V11A.

As will be evident, magnetic memory or storage circuitry of the system presented in Figs. 10A and 10B is suitable for various other circuit applications. With respect to this condition sensing and memory circuitry, it is to be observed that the most common system now used for comparable control is a motor which rests in its last position when the carrier or other signal fades. However, such a motor is comparatively quite expensive and requires appreciable circuitry for driving same. The magnetic storage device per se, which is also known as a magnistor, is commercially available, with three windings; an input, an output and an erase, as indicated. These windings are wound around square hysteresis loop type material, and when the input control current ceases, the magnetic characteristics of the material tend to remain constant. If the material were perfectly square looped, it would remain perfectly constant; however, there is some degree of droop. The storage circuitry presented, however, eliminates this problem.

What is done, basically, in the memory circuit presented, is to periodically feed an input current wave to the magnistor input winding. This current is proportional to the signal to be stored. Then, periodically, the current is disabled and then an output measurement is made which is a function of the magnetic condition of the magnistor, producing a voltage which is a function of the stored information.

After the sample period, an erase current is fed to the magnistor, putting it in condition for the next sampling cycle. This cycling is done in the circuit presented at a line frequency rate, i.e. 50–60 cycles. By measuring the magnetic characteristic of the set impulse, it is not necessary to rely upon the squareness of the hysteresis loop and the storage characteristic for maintaining frequency control during fade has proven to be excellent. The gist of the circuit will be observed to be a recycling of set-measure-reset, coupled with the fact that measurement is done when there is no current fed to the input or erase winding.

To increase the sensitivity of the magnetic storage device MSD, the output winding is advantageously made part of a tuned circuit at 100 kc., and when the 100 kc. current is fed to it, and slight shifts in the set pulse amplitude cause slight changes in the effective reactance of the output winding which is part of a tuned circuit tuned slightly off 100 kc. These small changes in inductance cause appreciable changes in impedance because the tuned circuit is operated close to resonance. Accordingly, this circuit has good linearity and highly sensitive response characteristics.

Reactance tube V11A varies the frequency of oscillator V12A, according to the required frequency correction. The oscillator frequency of oscillator V12A is 100 kc. higher than the IF frequency of the associated receiver, plus or minus the desired drift cancellation frequency. The output of the oscillator V12A, is fed to a cathode follower V12B, which in turn feeds the associated single-sideband receiver adapter. A meter relay M1 is incorporated in the plate circuit of V11B so that when the error voltage is too great or too small, the meter relay M1 energizes a warning light E1 or, if desired, an external relay, used to actuate another form of alarm, such as a bell. This meter relay M1 is also usable to determine the correct tuning point of the associated receiver.

The output of V1A is also fed to an AGC circuit which allows the choice of carrier or total signal or receiver AVC, and also allows use of slow, medium or fast AGC time constants. The time constant for the fast circuit is approximately one-tenth of a second.

It is to be also noted, in the schematic presentation of Figs. 10A and 10B, that the filaments of the oscillators and reactance tube are regulated to minimize drift.

Also, and in general, with regard to the schematic presentation of Figs. 10A and 10B it will be understood that the primary purpose thereof is to show a detailed schematic arrangement of a typical commercial installation embodying the automatic frequency control system of the present invention, and that reference should be made directly to the schematic for specific typical component values, consistent with and resulting in the manner of operation above described.

In connection with the foregoing description of the nature and manner of operation of the circuit schematically presented in Figs. 10A and 10B, various considerations are to be observed as to certain of the operational controls involved. With respect to the carrier level control adjustment (CL), such should be placed in the minimum position if the associated transmitter is adjusted for —20 db suppressed carrier operation. If a full carrier is transmitted, such as in a compatible single-sideband operation, the carrier level adjustment should be close to maximum position, and for intermediate values of carrier transmission, intermediate settings of this control are to be made. The local-reconditioned carrier switch is to be set to the desired mode of operation. For severely fading signals, the local carrier setting should be used. If the signal is not experiencing severe fading, the reconditioned carrier setting is to be preferred. The lock position on the AFC switch SW2 is intended for use only where extremely stable transmitters and receivers are employed and where exact synchronization of the carrier is necessary.

With respect to adjustment for AFC control during carrier fades, it is to be first observed that the differential gain adjustment (DG) is provided in the output of V2A (at point Z), to control the point where the carrier fade circuitry operates and switches over to the storage condition. The higher the differential gain is, the greater will be the difference in the 100 kc. carrier level at the output of V2A (point Z) for a given change in carrier level. A variable bias adjustment is provided in the diode circuit between stages V2A and V2B for controlling the differential gain of the 100 kc. carrier going to V2A. All these adjustments function to vary the overall differential gain. The appropriate setting of these adjustments depends upon how flat the receiver AVC characteristic is. The more constant the output level is for a variation in signal level (flatter AVC characteristic) the more the needed differential gain. Once the adjustments associated with the input to stage V2A are set, the adjustment provided at the grid of tube V10A is adjusted to the desired point of relay operation, i.e. 6 db fade, 10 db fade, etc.

From the foregoing discussion and the associated diagrammatic and schematic presentations of typical forms of circuitry involving the automatic frequency control system and memory circuitry of the present invention, further various applications and modifications thereof will readily occur to those skilled in the art, within the spirit and scope of the following claims.

What is claimed is:

1. An automatic frequency control circuit comprising means selecting and isolating a sample of a carrier component frequency, means generating a stable reference frequency, means mixing a sample of said carrier component frequency and said reference frequency in a manner producing relatively sharp frequency modulation excursions, discriminator means deriving positive and negative pulses of frequency modulation from said frequency modulation excursions, means separating and comparing said positive and negative pulses, means deriving a corrective signal from the pulse comparison means, and means regulating said carrier component frequency responsive to said corrective signal.

2. Automatic frequency control means comprising means selecting and isolating a sample of a carrier component frequency, means generating a stable reference frequency, means mixing a sample of said carrier component frequency and said reference frequency, means amplitude limiting the output from said mixing means, discriminator means deriving positive and negative pulses of frequency modulation from the output amplitude limiting means, gating means separating said positive and negative pulses, summation means comparing said positive and negative pulses, low pass filter means deriving from the output of said summation means a corrective signal, and frequency correction means responsive to said corrective signal and regulating the frequency of said oscillator.

3. In an electronic system requiring frequency stabilization and having an oscillator generating a carrier component frequency, means selecting and isolating a sample of said carrier component frequency, means generating a stable reference frequency of about equal amplitude and frequency as compared with said first-mentioned frequency sample, means mixing said frequency sample and said reference frequency, means amplitude limiting the output from said mixing means, discriminator means deriving positive and negative pulses of frequency modulation from the output of said amplitude limiting means, gating means separating said positive and negative pulses, summation means comparing said positive and negative pulses, low pass filter means deriving from the output of said summation means a corrective signal, and reactance tube means responsive to said corrective signal and regulating the frequency of said oscillator.

4. In an electronic system requiring frequency stabilization and having an oscillator generating a first frequency, means selecting and isolating a sample of said first frequency, means generating a second frequency to serve as a stabilization standard, means mixing said first frequency sample and said second frequency, means amplitude limiting the output from said mixing means, discriminator means deriving positive and negative pulses of frequency modulation from the output of said amplitude limiting means, gating means separating said positive and negative pulses, summation means comparing said positive and negative pulses, low pass filter means deriving from the output of said summation means a corrective signal, and reactance tube means responsive to said corrective signal and controlling said oscillator so that said first frequency is maintained substantially the same as said second frequency.

5. In an FM type electronics circuit requiring frequency stabilization and having an oscillator generating a carrier component frequency, means selecting and isolating a sample of said frequency, means generating a stable reference frequency, means mixing said carrier frequency sample and said reference frequency, means amplitude limiting the output from said mixing means, discriminator means deriving positive and negative pulses of frequency modulation from the output of said amplitude limiting means, gating means separating said positive and negative pulses, separate pulse counting means for said positive and negative pulses, summation means fed by said pulse counting means and comparing said positive and negative pulses, low pass filter means deriving from the output of said summation means a corrective signal, and reactance tube means responsive to said corrective signal and regulating the frequency of said oscillator.

6. An FM transmitter according to claim 5, wherein said reference frequency is a carrier component frequency of a second FM transmitter, said transmitters constituting a multi-plex pair.

7. In an electronic system requiring frequency stabilization and having a local oscillator and a mixer stage deriving a predetermined frequency from said oscillator, automatic frequency control means comprising a second mixer stage and amplitude limiting means deriving from said oscillator and said predetermined frequency an output characterized by relatively sharp positive and negative frequency modulation excursions, discriminator means deriving positive and negative pulses of frequency modulation from the output of said mixing and amplitude limiting means, gating means separating said positive and negative pulses, summation means comparing the outputs from said gating means, low pass filter means deriving from the output of said summation means a corrective signal, reactance tube means responsive to said corrective signal and controlling the frequency of said local oscillator.

8. In a single-sideband receiver and the like including a high frequency oscillator and a first mixer stage deriving an intermediate frequency from said high frequency oscillator and the incoming sideband and carrier wave, automatic frequency control means comprising a second local oscillator, a second mixer stage deriving from said intermediate frequency from said second local oscillator an output including a carrier component and a sideband component, carrier pass filter means isolating said carrier, means amplitude limiting a sample of said isolated carrier, means mixing and amplitude limiting said isolated carrier sample and said reference frequency, discriminator means deriving positive and negative pulses of frequency modultion from the output of said mixing and amplitude limiting means, gating means separating said positive and negative pulses, summation means comparing the outputs from said gating means, low pass filter means deriving from the output of said summation means a corrective signal, and reactance tube means responsive to said corrective signal and controlling the frequency of said second local oscillator.

9. In radiant energy receiving equipment subject to occasional fading of the received signal and having a local ocsillator establishing a predetermined IF for the equipment, automatic frequency control means comprising means selecting and isolating a sample of a signal carrier component frequency, means generating a stable reference frequency, means mixing said carrier component frequency sample and said reference frequency, means amplitude limiting the output from said mixing means, discriminator means deriving positive and negative pulses of frequency modulation from the output amplitude limiting means, gating means separating said positive and negative pulses, summation means comparing the outputs from said gating means, low pass filter means deriving from the output of said summation means a corrective signal, corrective signal storage means operable to maintain the corrective signal during periods of received signal fading, and reactance tube means responsive to said corrective signal and regulating the output frequency of said local oscillator.

10. In radiant energy receiving equipment subject to occasional fading of the received signal and having a local oscillator establishing a predetermined IF frequency for the equipment, automatic frequency control means comprising means selecting and isolating a sample of the signal carrier component frequency, means generating a stable reference frequency, means mixing said carrier component frequency sample and said reference frequency, means amplitude limiting the output from said mixing means, discriminator means deriving positive and negative pulses of frequency modulation from the output amplitude limiting means, gating means separating said positive and negative pulses, summation means comparing the outputs from said gating means, low pass filter means deriving from the output of said summation means a corrective signal, corrective signal storage means operable to maintain the corrective signal during periods of received signal fading, said corrective signal storage means comprising a magnetic storage device having an input coil, an output coil, and an erase coil, means operative during a sampling period to energize said input coil with a current proportional to the signal to be stored, means energizing said erase coil during an erase period when the received signal level exceeds a predetermined value, means cyclically keying the respective coil energization means to establish said sampling, measuring and erasing periods, and means disabling said erase coil energization means and the input coil energization means when the received signal level is less than said predetermined value, the magnetic energization state of the output coil and the amplitude of the output in such latter event being substantially maintained until said input and erase coils are again energized in response to resumption to said first-mentioned predetermined manner of operation of said associated equipment, said automatic frequency control means further comprising a reactance tube responsive to the output level of said output coil during said measuring period and regulating said local oscillator to maintain said IF frequency substantially constant even during periods of carrier fade.

11. Radiant energy receiving equipment according to claim 10, wherein said corrective signal is a keyed, high frequency signal and the output circuit associated with said output coil is tuned substantially to said frequency.

12. Radiant energy receiving equipment according to claim 10, wherein said means recyclically keying the respective coil energization means to establish said sampling, measuring and erasing periods is keyed at a low frequency rate.

13. Radiant energy receiving equipment according to claim 12, wherein said low frequency rate is 50–60 cycles per second.

References Cited in the file of this patent

UNITED STATES PATENTS

| | | |
|---|---|---|
| 2,805,408 | Hamilton | Sept. 3, 1957 |
| 2,831,115 | Hahnel | Apr. 15, 1958 |